Aug. 13, 1968 D. K. CUNNINGHAM ET AL 3,397,065

EDIBLE FOOD RELEASE COMPOSITION

Filed July 23, 1965 2 Sheets-Sheet 1

*INVENTOR.*

DAVID K. CUNNINGHAM
RICHARD G. HANS

EDIBLE FOOD RELEASE COMPOSITION

Filed July 23, 1965

INVENTOR.
DAVID K. CUNNINGHAM
RICHARD G. HANS

United States Patent Office 3,397,065

Patented Aug. 13, 1968

3,397,065

EDIBLE FOOD RELEASE COMPOSITION

David K. Cunningham, Minneapolis, Minn., and Richard G. Hans, Louisville, Ky., assignors to The Pillsbury Company, Minneapolis, Minn., a corporation of Delaware Filed July 23, 1965, Ser. No. 474,440
22 Claims. (Cl. 99—90)

ABSTRACT OF THE DISCLOSURE

An edible release agent comprised of an edible oil and a suspension of finely divided silica particles having a particle size of less than 0.3 micron therein; food products and the inner surfaces of food containers coated with the same.

Figure 1:
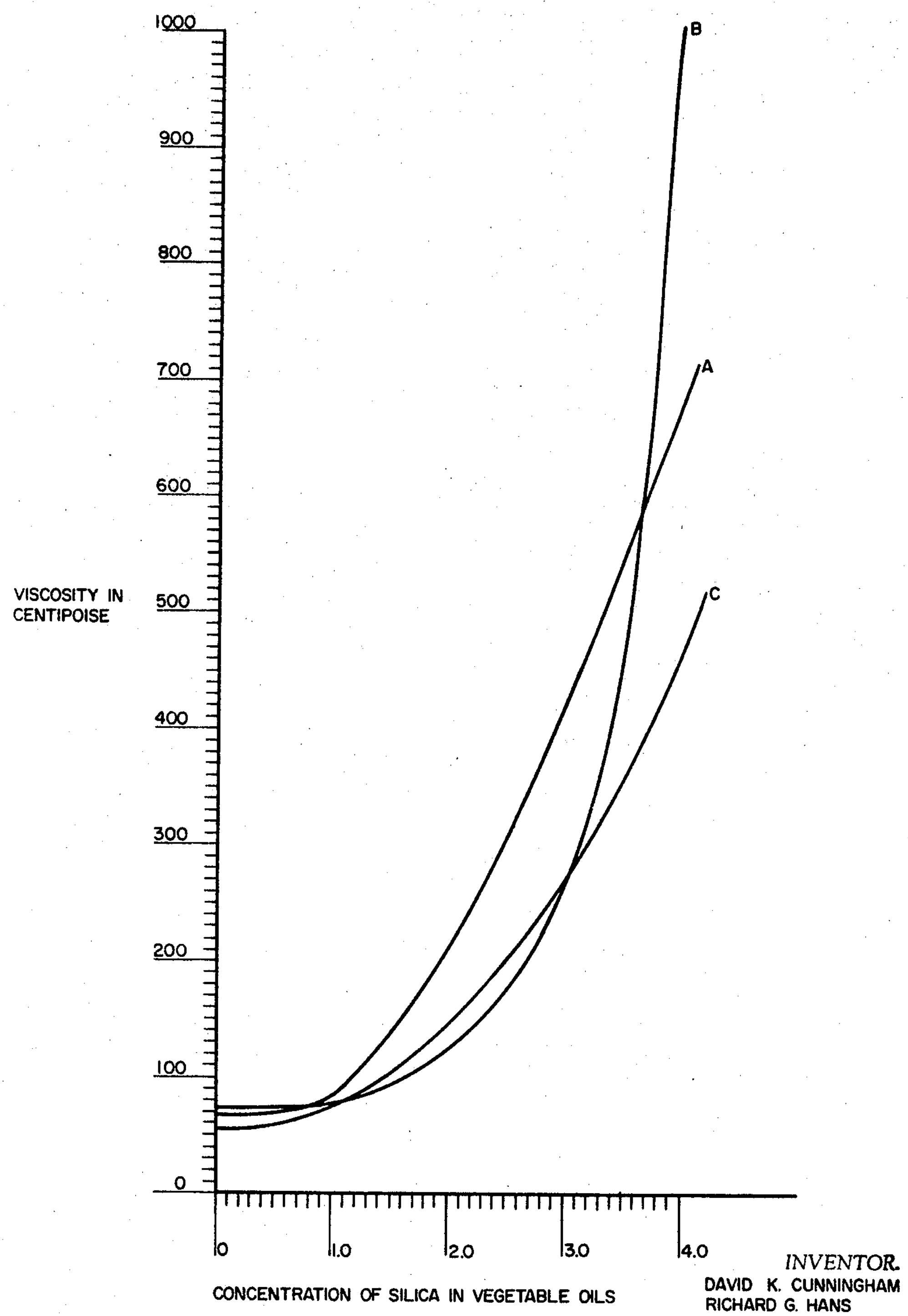
Figure 2:
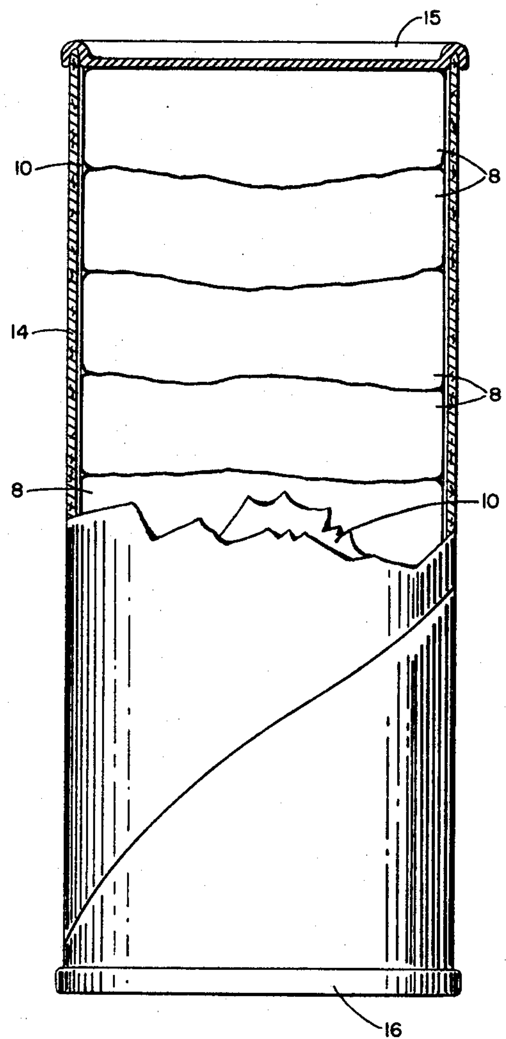

This invention relates to a novel edible release agent. More particularly the present invention relates to a novel composition containing an edible oil and a silica adaptable for use as a release agent in the food industries and the methods relating thereto.

An object of the present invention is to provide a novel release agent having superior properties.

Another object of the present invention is to provide a low cost release agent.

It is a further object of the present invention to provide a method of applying a release agent and to products relating thereto.

Heretofore it has been conventional to employ edible oils such as corn and cottonseed oils as a release agent to permit removal of refrigerated dough products such as pie crust, biscuits, rolls, pastries and the like from containers. These edible vegetable oils are generally applied by spraying the inner surfaces of the container with the edible oil and subsequently placing the dough product therein. Considerable difficulty has been encountered in that the edible vegetable oil drains from the container wall before the dough can be placed therein. Such edible oils have also been employed to separate various dough products such as biscuit discs, etc. from one another and often applied between the individual laminates in laminated dough products. However, the edible oils have an undesirable property of penetrating the dough with a resulting greasy texture and taste in the ultimate baked product. Penetration of the edible oil into the dough product results in elimination of the releasing effect of the edible oil. In order to compensate for the loss of release agent that invariably occurs, it has been necessary to employ excessive amounts of the edible oil.

It has been proposed that more viscous release agents such as the animal fats and hydrogenated oils be employed. The use of the viscous release agents does not entirely eliminate the problem of penetration of the release agent into the dough product. Tenderness of the ultimately baked product is somewhat impaired from employing viscous release agents. The disadvantage of the viscous release agents is magnified when applied to intricately designed refrigerated dough products such as the chemically-leavened cloverleaf dinner rolls. In such a system a release agent such as butter tends to produce a large cavity in the central portion of the dinner roll (i.e. an internal void). Attempts have been made to eliminate this cavity formation by employing edible oils like cottonseed and soybean oils. Unfortunately the edible oils have an adverse effect upon the ultimately baked product in that there is substantial reduction in volume without the desired concomitant blossoming effect (i.e. expansion of the integrally connected cloverleafs). Also the edible oils fail to provide an effective means of separating the various cloverleafs when used by the ultimate consumer.

In the drawings:

FIGURE I is a graphical illustration showing the change in viscosity achieved by employing various concentrations of "pyrogenic" silica in combination with edible oils.

FIGURE II is an axial view of a cylindrical refrigerated food package with a cut-away portion depicting container construction and the contents therein.

According to the present invention, there is provided a novel edible viscous release agent adapted for use in the coating of food containers and as a release agent between various layers of refrigerated dough products. The release agent of the present invention comprises an edible oil and an edible silica particulate in an amount sufficient to increase the viscosity of the admixture to at least 100 c.p.s.

Typical edible oils employable in the instant invention include olive oil, peanut oil, rape oil, sunflower seed oil, corn oil, cottonseed oil and soybean oil. Generally, these oils have a viscosity ranging from about 50 to about 80 c.p.s. The preferred edible oils are corn, cottonseed, and soybean oil, with soybean oil being the most preferred edible oil.

The edible silica particulates employable herein are those particulates of silica that are capable of increasing the viscosity of the above-mentioned edible oils when admixed therein in amounts ranging from about 1 to about 4 weight percent. Advantageously the instant release agents contain the edible silica particulates having a particle size ranging from about 0.01 micron to about 0.03 micron. Unexpectedly high effectiveness is achieved by the use of silica particulates of a particle size ranging from about 0.015 micron to about 0.02 micron. In general, the edible silica particulate employed are those commonly known to the art as "pyrogenic" silica and are prepared by reaction of vaporized silicon carbon tetrachloride and water.

The release agent compositions disclosed herein are prepared by conventional methods usually employed by the art to obtain uniform admixtures such as a constant-speed stirrer, a Waring Blendor, etc.

It has been found that when the instant release agent is applied to the inner surfaces of refrigerated dough containers it forms an interface thereon that is not subject to gravitational drainage. Thus the instant release agents provide a more efficient method of applying the release agent with less chance of loss of effectiveness due to drainage from the can. Upon prolonged refrigeration the release agents are stable. Consequently when the refrigerated product is to be used by the ultimate consumer, the dough product readily separates from the container walls. Penetration of the release agent into the dough product is substantially reduced. Thus the release agent retains its separating effectiveness for separating dough products from one another. Unlike the fatty release agents the present release agents do not produce large voids or air pockets in the ultimate baked product when employed between dough products containing a plurality of integral parts such as cloverleaf biscuits and laminated dough products. Elimination of cavity formations is accomplished without adversely affecting the tenderness of the baked products. In general, there is a substantial saving in the amount of separating agent necessary to provide the releasing activity. In comparison to the edible oils there is substantial improvement in the resultant volume of the baked product and enhanced separability thereof.

The viscosity of the release agents employed herein have a viscosity range from about 100 cps. to about 500 cps. as ascertained by a Brookfiield viscometer at 23° C. employing a No. 3 spindle and operated at 30 r.p.m. As illustrated in FIGURE I the amount of "pyrogenic" silica necessary to provide a viscosity within this range depends to a large extent upon the particular edible oil employed. FIGURE I, line *a*, represents viscosity measurements of cottonseed oil having a concentration of "pyrogenic" silica ranging from 0.0 to 4.0 weight percent. Lines *b* and *c* respectively represent viscosity measurements with corn and soybean oil. As shown in the graph a weight percent of 1.15 "pyrogenic" silica will provide a viscosity of 100 cps. when employed with cottonseed oil whereas corn oil and soybean oil achieve a viscosity of 100 cps. at a level of about 1.65 and 1.40 weight percent respectively. Correspondingly, a viscosity of 500 cps. is attained at different amounts of "pyrogenic" silica for the various edible oils. Advantageously the release agents are added to edible oil in an amount sufficient to produce a viscosity ranging from about 120 cps. to about 250 cps. with an amount sufficient to effect a viscosity ranging from about 130 cps. to about 160 cps. being most preferred.

FIGURE II is illustrative of an axial view of a conventional refrigerated food package with a cut-away portion revealing the container construction and the biscuit discs 8 contained therein. Conventional refrigerated containers usually consist of a spiral-wound cylindrical member 14 of adequate construction to provide support against the expansive pressure of gas generated in the dough with metal plate ends 15 and 16 clamped thereon. The spiral-wound member 14 is preferably constructed of a material such as cardboard. The container is provided with an inner wrapper 10 adhered to the inner surfaces of spiral-wound-cylindrical member 14. Typical inner wrapper materials include a spiral-winding of impermeable material such as Pliofilm, glassine paper, moisture-proof cellophane, aluminum foil, tin foil or other resistant non-toxic foil or various laminates made up of two or more metals assembled or bonded together. The release agents of the present invention are equally adaptable to containers constructed of another material non-permeable to a gas such as plastic or metal container suitably provided with a gas vent. The release agents are applied to the inner exposed surface of the wrapper material or container by any conventional means such as hand applicators or by spray gun techniques. In producing the products shown in the drawing, a biscuit dough is made by mixing a dough product in accordance with ordinary bakery practice. The resulting dough is rolled out, cut, or extruded in discs. Each disc is covered either by hand application or mechanical means with the release agent described herein, to permit ready separation of one disc from another and from the container. The discs are then assembled one on top of another so that they occupy from 80 to 90 percent of the container height and then inserted into the cylindrical container with cap 15 being fitted over the container 14 and secured into place by crimping the edge as shown.

Typical dough products contemplated herein are those relating to pre-leavened and unleavened dough commonly employed in making rolls, biscuits, pastry, bread, cookies, crullers, pancakes, dumplings, waffles and the like and particularly the refrigerated dough products hereof.

The following examples are illustrative of the invention:

EXAMPLE I

A premixed dough was made by combining the following ingredients in a conventional dough mixer:

Preparation of the dough

| Ingredients: | Parts by Weight |
|---|---|
| Flour | 100 |
| Non-fat dry milk | 6.25 |
| Cane sugar | 6.25 |
| Shortening (margarine) | 6.25 |
| Salt | 1.4 |
| Sodium bicarbonate | 2 |
| Sodium acid pyrophosphate | 2.8 |
| Water | 53.3 |

The dough was then chilled to a temperature of 60° F., rolled out and cut into discs of about ¼ inch thick and 2 inches in diameter.

Preparation of the release agent

To a Waring Blendor there were added 7.84 ounces of cottonseed oil having a viscosity at 23° C. of about 64 cps. and 0.16 ounce of "pyrogenic" silica.[1] The resultant blended release agent has a viscosity of 220 cps.

To the surface of each disc a thin film of about 55 microns was applied by means of a Burgess BVI spray gun equipped with a standard sapphire nozzle. Ten discs discs were then placed upon another and inserted into a standard 8-ounce refrigerated biscuit container. The tin plate cap was then fitted over the container tube and secured in place by crimping. The containers were then passed through a proofing tunnel and refrigerated at 35–40° F. for 35 days. The contents were then removed from the containers. It was observed that the biscuit discs readily separated from the container walls and from one another without any concomitant adherence or sticking. The biscuit discs were then baked at 400° F. for 12 minutes. The resultant baked products were satisfactory in regard to volume, tenderness and texture. For comparative purposes cottonseed oil per se was employed as a release agent under identical conditions. Considerable sticking and adherence between the dough products and container surface was observed along with excessive penetration of the release agent into the dough product. The resultant baked products wherein cottonseed oil per se was employed as a release agent were inferior in appearance, volume and tenderness.

EXAMPLE II (A) Preparation of a soybean oil-silica release agent

Into a Waring Blendor there were placed 7.85 ounces of soybean oil (viscosity 60 cps.) and 0.16 ounce of the "pyrogenic" silica as described in Example I.

(B) Preparation of the cloverleaf dinner roll dough

A premixed dough was made by incorporation of appropriate amounts of the following ingredients in a dough mixer.

Ingredients:
- Flour
- Water
- Sugar
- Leavening acid
- Sodium bicarbonate
- Shortening
- Emulsifier
  - Lactylic stearic
  - Mono and diglycerides
- Egg yolk (solids)
- Non-fat dry milk solids
- Salt
- Artificial flavoring (C) Preparation of the packaged food product For handling ease, the dough was then divided into pieces weighing about 10 pounds each and processed separately. Each piece was passed through a set of rollers to produce a sheet of about 15 inches wide and 45 inches long and ½ inch thick. The dough sheet was then cut and scored by a cutting and scoring grid to form integral dough units measuring 3¾ inches by 2⅔ inches wherein the scoring grids compressed the dough to about 10% of its original volume. The score marks formed three ¾ inch dough squares integrally connected to one another

[1] "Cab-O-Sil" sold by the Cabot Corporation and having the following properties:

| Property | Unit | Value |
|---|---|---|
| Particle size | micron | 0.015–0.020 |
| Total surface area (BET nitrogen absorption) | m./g. | 190 |
| Loose bulk density | lb./ft.³ | 2.2 |
| Moisture content | percent max. | 1.5 |
| Silica content, moisture-free basis | percent | 99.7–99.9 |

through the scored dough. The soybean-silica release agent was applied by a Burgess BVI spray gun forming a film of about 250 microns. The integral dough units were then rolled by hand into a disc form of about 1.125 inch diameter. Nine dough discs thus prepared were stacked upon one another and packed and sealed in a 9.6-ounce refrigerated dough container. The container containing the cloverleaf dinner rolls were passed through a proofing tunnel maintained at 100° F. and refrigerated at 35–40° F. for 60 days.

For comparative purposes employing the above-mentioned techniques refrigerated cloverleaf dinner rolls were prepared and packaged with the exception that butter and soybean oil were used as the release agent.

The specific methods employed in tests noted in Tables I and II are as follows:

(A) Performance index is a subjective rating of characteristics important to the overall product based on 100 being excellent in all areas. Each has its own index. Cloverleaf dinner roll index measurements of importance are:

(1) Separation of nine rolls one from another to place in muffin tin.

(2) Dough condition—a rating of stability during shelf-life.

(3) General appearance of baked product including color, blossom and uniformity from roll-to-roll in same can.

(4) Internal ratings include crumb, color, grain, size, texture, tenderness and internal voids.

(B) Separation—a term used to describe the function of keeping the three dough sections or cloverleaves of each roll divided sufficiently to blossom during baking into three 3-leaf clover on top surface, but remain touching internally for proper eating texture.

(C) Internal void—a technical term used to describe the internal void in the center of the three cloverleaves where their surfaces should touch each other. The internal void produces a falling apart of the roll and tough eating characteristics.

(D) Blossom describes the rounded appearance of the three individual cloverleaves of each roll as they tend to separate from the center.

(E) Specific volume is a numerical description of the relationship between the weight of baked product and the area it occupies. This is measured in cubic centimeters per gram of baked product. In general, the higher the specific volume, the lighter texture and more tender will be the baked product.

(F) Tenderness by shear press is an objective measurement of force (in pounds) required to completely shear a whole roll or biscuit in a constant time period. The lower value indicates a more tender texture, a high numerical value indicates toughness as the specific volume remains a constant.

Table I discloses comparative results of baked cloverleaf dinner rolls (preheat oven to 375° F. for 12 minutes) employing butter and the soybean oil-silica release agent.

TABLE I

| Test | Butter | Soybean Oil-Silica (2 percent by weight) |
|---|---|---|
| Number of Internal Voids (1,000 9.6-oz. containers) | 420 | 7 |
| Specific Volume (Avg.) | 4.50 | 4.41 |
| Performance Index | 79.5 | 79.5 |
| Separation (percent above median score of 8) | 12 | 46 |
| Tenderness (Avg.) (shear force in pounds) | 252 | 227 |

As shown in Table I, the soybean oil-silica release agent provides superior results in the baked product in respect to reduction of the incidence of cavitation and separation with improved tenderness. These superior results are achieved without adversely affecting the specific volume and performance index.

Table II discloses the superior comparative results achieved by use of soybean oil-silica over that of soybean oil per se.

TABLE II

| Test | Soybean Oil | Soybean Oil-Silica |
|---|---|---|
| Specific Volume | 4.14 | 4.41 |
| Performance Index | 72 | 79.5 |
| Blossom (percent above median score of 6) | 8 | 39 |

Additional benefits observed by the employment of the soybean oil-silica over that of soybean oil per se were superior ease of separations from the containers and dough products from one another especially after extended refrigeration (e.g. 10 weeks).

EXAMPLE III

Employing the same biscuit dough mix as Example I, the dough was rolled and extruded into discs of about ¼ inch thick and about 2 inches in diameter. The flat surface of each disc was sprayed with a release agent which had been prepared by a Waring Blendor and consisting of 490 grams corn oil and 10 grams of "pyrogenic" silica having a particle size ranging from 0.015 to 0.020 micron in diameter and sold under the trade name of "Cab-O-Sil" and having a resultant viscosity of 125 cps. at 23° C. Employing the same container disclosed in Example I, there was applied to the inner surfaces a release agent film of about 70 microns. Unlike corn oil per se, the film of release agent remained intact upon the inner surfaces of the container even after 60 days. The dough discs were then placed into the biscuit container until 80 percent of the container height was occupied by the dough disc. The tin plate end coated with the release agent was placed upon the upper end of the container and clamped thereon. After proofing, the package dough product was then refrigerated at 40° F. for 60 days and thereafter the contents were removed. No adherence of the dough discs to the container walls and betwen the respective biscuit discs was observed.

What is claimed is:

1. An edible release agent adapted for use in coating of edible food products and the inner surfaces of food containers, said release agent consisting essentially of an edible oil and edible silica particulates suspended therein, said particulates having a particle size of less than 0.3 micron and being present in an amount ranging from about 1 to about 4 weight percent of the edible oil weight.

2. The edible release agent according to claim 1 wherein the edible silica is an admixture with the edible oil in an amount sufficient to increase the viscosity at 23° C. to at least 100 cps.

3. The edible release agent according to claim 2 wherein the the amount of silica is sufficient to increase the viscosity from about 100 cps. to about 500 cps. at 23° C.

4. The edible release agent according to claim 3 wherein the amount of silica and edible oil is sufficient to produce an edible release agent having a viscosity at 23° C. ranging from about 120 cps. to about 250 cps.

5. The edible release agent according to claim 4 wherein the silica has a particulate size ranging from about 0.015 micron to about 0.020 micron.

6. The edible release agent according to claim 5 wherein the edible oil selected from the group consisting of olive oil, peanut oil, rape oil, sunflower seed oil, corn oil, cottonseed oil and soybean oil.

7. The edible release agent according to claim 6 wherein the edible oil is corn oil.

8. An edible release agent according to claim 6 wherein the edible oil is cottonseed oil.

9. An edible release agent according to claim 6 wherein the edible oil is soybean oil.

10. A method of reducing the adhesion of dough products and the inner surfaces of containers which comprises providing a release agent upon at least one of said surfaces, said release agent comprising an admixture of an edible oil and silica particulates and having a viscosity ranging from about 100 cps. to about 500 cps. and thereby forming an interface on at least one of said surfaces.

11. The method according to claim 10 wherein the release agent has a viscosity of 23° C. ranging from about 120 cps. to about 250 cps.

12. A method of preventing adhesion of dough food products to the inner surface of container in which said dough products are to be refrigerated which comprises applying a release agent to the surface, said agent consisting essentially of an edible admixture of silica particulate and an edible oil, the release agent having a viscosity at 23° C. ranging from about 120 cps. to about 250 cps. and thereby forming a viscous interface on said surface preventially adherent thereto rather than to the contents of the container.

13. A method according to claim 12 wherein the silica particulates have a particle size ranging from 0.01 micron to about 0.03 micron and the edible oil is selected from the group consisting of olive oil, peanut oil, rape oil, sunflower seed oil, corn oil, cottonseed oil and soybean oil.

14. The method according to claim 13 wherein the edible oil is cottonseed oil and the particulates have a particle size ranging from about 0.015 to about 0.020 micron.

15. The method according to claim 13 wherein the edible oil is soybean oil and the particulates have a particle size ranging from about 0.015 to about 0.020 micron.

16. The method according to claim 13 wherein the edible oil is corn oil and the particulates have a particle size ranging from about 0.015 to about 0.020 micron.

17. A method of reducing the adhesion of a plurality of dough materials from one another which comprises applying to the surface of the dough product an edible release agent consisting essentially of an edible oil and an edible silica particulates ranging from about 0.01 to about 0.03 micron in diameter, said release agent having a viscosity at 23° C. ranging from about 120 cps. to about 250 cps.

18. As an article of manufacture, a refrigerated dough package product comprising a container, a dough contained within said container, and a release agent, said release agent being coated upon the inner surface of said container and consisting essentially of an admixture of an edible silica particulate and an edible oil having a viscosity at 23° C. ranging from about 125 cps. to about 250 cps.

19. A dough product consisting essentially of a plurality of dough masses and an edible release agent applied to the dough masses to provide separation of the respective masses from one another, said release agent consisting essentially of an edible oil and edible silica particulates having a particle size ranging from 0.015 to 0.020 micron said release agent containing sufficient silica to provide a viscosity at 23° C. ranging from about 120 cps. to about 250 cps.

20. As an article of manufacture a refrigerated dough product comprising a container, a plurality of dough masses contained within said container, a release agent applied to the dough masses to provide separation of the respective masses from one another, said release agent consisting essentially of an admixture of edible silica particulates and an edible oil and having a viscosity at 23° C. ranging from about 124 cps. to about 250 cps.

21. The article of manufacture according to claim 20 wherein the inner surfaces of the container has a coating of the release agent.

22. As an article of manufacture a refrigerated dough package product comprising a container, a dough mass comprising a plurality of dough masses contained within said container and a release agent consisting essentially of an edible silica and an edible oil and having a viscosity at 23° C. ranging from about 125 cps. to about 250 cps., said release agent being applied to the surface of dough masses to provide separation of the respective dough masses from one another and from the inner surfaces of the container.

References Cited

UNITED STATES PATENTS

| | | | |
|---|---|---|---|
| 3,036,002 | 5/1962 | Holmgren | 252—28 |
| 3,271,165 | 5/1963 | Hansen | 99—118 |

OTHER REFERENCES

Dr. J. J. Russell, Bakers Weekly, Dec. 18, 1950, pp. 41–44.

RAYMOND N. JONES, *Primary Examiner.*

E. A. MILLER, *Assistant Examiner.*